United States Patent [19]

Nonaka

[11] Patent Number: 5,205,897
[45] Date of Patent: Apr. 27, 1993

[54] METHOD OF BONDING LOUDSPEAKER DIAPHRAGM

[75] Inventor: Yoshinori Nonaka, Kashiwara, Japan

[73] Assignee: Onkyo Corporation, Osaka, Japan

[21] Appl. No.: 720,062

[22] Filed: Jun. 24, 1991

[30] Foreign Application Priority Data

Jun. 29, 1990 [JP] Japan .................................. 2-172987

[51] Int. Cl.$^5$ ............................................... C09J 5/04
[52] U.S. Cl. ..................................... 156/315; 29/594;
156/307.5; 156/310; 181/167; 181/170;
381/150; 525/903
[58] Field of Search ..................... 156/315, 310, 307.5;
525/43, 903; 29/594; 181/167, 170; 381/150

[56] References Cited

U.S. PATENT DOCUMENTS 4,190,746  2/1980  Harwood et al. .................... 181/170

FOREIGN PATENT DOCUMENTS 1427778  3/1976  United Kingdom .................. 29/594

Primary Examiner—John J. Gallagher
Attorney, Agent, or Firm—Edwin E. Greigg; Ronald E. Greigg

[57] ABSTRACT

A loudspeaker component is bonded to a diaphragm formed of an olefinic resin, by applying an adhesion primer to bonding positions of the component and/or the diaphragm, applying an adhesive to the bonding positions after the primer has cured, and superposing the component and diaphragm. An air curing unsaturated polyester resin is used as the adhesion primer.

12 Claims, No Drawings

METHOD OF BONDING LOUDSPEAKER DIAPHRAGM

BACKGROUND OF THE INVENTION

1. Field of the Invention

This invention relates to a method of bonding loudspeaker diaphragms, and more particularly to a method of bonding loudspeaker diaphragms formed of an olefinic resin.

2. Description of the Related Art

Generally, a rubber, acrylic or epoxy adhesive is used in bonding a surround, a voice coil bobbin and a dust cap to a loudspeaker diaphragm formed of an olefinic resin such as polyethylene or polypropylene, or a polyester resin.

An olefinic resin is a crystalline resin having little or no polarity, which makes bonding difficult. To improve the adhesive property, a method has been proposed which applies a surface treatment to bonding positions such as surface polishing, flame treatment, chemical treatment, corona discharge, plasma treatment, or ultraviolet radiation. In another method, a helical groove making at least one circle is formed in each bonding position to produce a screw-like effect, thereby securing a necessary bonding strength (Japanese Patent Publication Kokai No. 1988-283395). In a further method, a silicone rubber adhesive is used as an adhesive or an adhesion primer (Japanese Patent Publication Kokai No. 1984-86399).

These treatment methods have the following disadvantages. A surface treatment is carried out to form polar groups such as —OH group, —COOH group and —NH$_2$ group on a nonpolar surface of an olefinic resin. Surface polishing has the disadvantage of injuring the surface and impairing the appearance of products. A flame treatment is not entirely satisfactory with regard to uniform surface finish, and could be dangerous to operators. A chemical treatment poses a problem of pollution, and subjects operators to danger. A corona discharge loses its effect several hours from the execution. A plasma treatment and ultraviolet radiation require sophisticated and costly equipment, and may endanger operators. The method of forming helical grooves extending through at least one circle results in a complicated manufacturing process, low productivity and high cost. The method in which a silicone rubber adhesive is used as an adhesive or an adhesion primer fails to assure a sufficient bonding strength, whereby the components could be separated by sudden, great vibrations.

With digitalization of sound sources and increased outputs of amplifiers, there is a mounting demand today for high input durability loudspeakers based on an increased bonding strength. However, none of the conventional methods of bonding loudspeaker diaphragms formed of an olefinic resin are satisfactory, or effective without relying on large and expensive equipment.

SUMMARY OF THE INVENTION

An object of the present invention is to provide a method of bonding loudspeaker diaphragms, which assures a bonding strength comparable to or even greater than the use of a rubber or acrylic adhesive after a surface treatment, without increasing cost due to a substantial increase in the number of manufacturing steps, without using a chemical dangerous to operators, and without using large and expensive equipment.

The above object is fulfilled, according to the present invention by a method of bonding a loudspeaker diaphragm in which an adhesive is applied to bonding positions of the diaphragms, which is formed of an olefinic resin, and/or to an object, after an adhesion primer comprising an air curling unsaturated polyester resin is applied to the bonding positions, the loudspeaker diaphragm and the object being superposed through the bonding positions.

When the adhesion primer comprising the air curing unsaturated polyester resin is applied to an olefinic resin, hydrocarbon chains having strong affinity to the olefinic resin permeate and spread inwardly of the material, and rigid bonding is formed by entanglement of mutual molecular chains. On the other hand, polar groups due to the unsaturated polyester resin are oriented on the surface of the material, which rigidly bond with a rubber or acrylic adhesive. Consequently, the diaphragm rigidly bonds with an object such as a surround, voice coil bobbin or dust cap. Thus, the present invention is characterized by use of an adhesion primer comprising the unsaturated polyester resin having an air curing property. The function and effect of the present invention cannot be produced by a simple, unsaturated polyester resin.

The air curing unsaturated polyester resin is obtained by giving an air curing property to an unsaturated polyester resin formed by condensation polymerization of a polybasic acid and a polyhydric alcohol. Generally, the air curing property of the unsaturated polyester resin is obtained by:

(1) denaturation of the polybasic acid contained in the unsaturated polyester resin, (2) denaturation of the polyhydric alcohol contained in the unsaturated polyester resin, (3) addition or denaturation of vinyl monomer, (4) addition of a thermoplastic polymer, (5) addition of drying oil or epoxidation oil, and (6) use of an unsaturated polyester resin having a high melting point.

The use of the air curing unsaturated polyester resin provides the loudspeaker diaphragm of an olefinic resin with a bonding strength comparable to or even greater than the use of a rubber or acrylic adhesive after a surface treatment such as ultraviolet radiation.

With the method of bonding a loudspeaker diaphragm according to the present invention, a low manufacturing cost is realized without increasing the cost due to a substantial increase in the number of manufacturing steps, without using a chemical dangerous to operators, and without using large and expensive equipment. This method may readily be introduced into a loudspeaker production line using belt conveyors, for example. The present invention thus provide a highly productive method of olefinic resin loudspeaker diaphragms.

Other features and advantages of the present invention will be apparent from the following description.

DETAILED DESCRIPTION OF THE PREFERRED EMBODIMENTS

Embodiments of the present invention will be described in detail hereinafter.

A loudspeaker diaphragm was formed of polypropylene as an example of olefinic resins. An adhesion primer comprising air curing unsaturated polyester resin of the present invention was applied by a brush to the diaphragm, and allowed to cure at room temperature (20° C.) for two days (48 hours). Subsequently, a rubber adhesive was applied to the diaphragm, and a cloth canvas was bonded to the diaphragm. The product was shelved for 168 hours. Each test piece included a polypropylene diaphragm 120 mm long (bonding portion: 80 mm) and 25 mm wide, and a canvas 180 mm long (bonding portion: 80 mm) and 25 mm wide bonded to the polypropylene diaphragm. A peel test was conducted wherein free portions of the polypropylene diaphragm and canvas were vertically oriented 180 degrees apart. Specifically, free portions of the polypropylene diaphragm and canvas were gripped and pulled by upper and lower chucks of a tension tester. Over ten test pieces were tested, and those showing proper peel conditions were adopted as test data.

First Embodiment

The unsaturated polyester resin included maleic anhydride as a polybasic acid, and ethylene glycol as a polyhydric alcohol. An appropriate quantity of chlorostyrene as a vinyl monomer was added to the resin to provide the air curing property. Further, a metallic salt type accelerator including manganese and octylic acid was used to promote copolymerization of the unsaturated polyester resin and vinyl monomer. The peel test was conducted on the resulting air curing unsaturated polyester resin to act as an adhesion primer.

Second Embodiment

The unsaturated polyester resin included terephthalic acid as a polybasic acid, and propylene glycol as a polyhydric alcohol. An appropriate quantity of vinyltoluene as a vinyl monomer was added to the resin to provide the air curing property. Further, dimethylaniline was used as a copolymerization accelerator. The peel test was conducted, as in the first embodiment, on the resulting air curing unsaturated polyester resin to act as an adhesion primer.

Third Embodiment

The unsaturated polyester resin included fumaric acid as a polybasic acid, and dipropylene glycol as a polyhydric alcohol. An appropriate quantity of vinyl acetate as a vinyl monomer was added to the resin to provide the air curing property. Further, a metallic salt of manganese and naphthenic acid was used as a copolymerization accelerator. The peel test was conducted, as in the first embodiment, on the resulting air curing unsaturated polyester resin to act as an adhesion primer.

Comparative Example

For comparison with the foregoing embodiments, a plasma treatment was given to the polypropylene diaphragm, as in conventional practice, for one minute with an oxygen gas plasma having a 500W output. After bonding this diaphragm and a canvas piece together, the same peel test was carried out as in the embodiments.

Test results are shown in the table below.

|  | Peeling Strength (kgf/inch) |
| --- | --- |
| 1st Emb. | 6.0–6.2 |
| 2nd Emb. | 5.3–5.7 |
| 3rd Emb. | 4.8–5.3 |
| Conventional | 5.0–5.5 |

Apart from the foregoing embodiments, isophthalic acid, succinic acid or adipic acid may be used as a polybasic acid. The polyhydric alcohol may be selected from di-ethylene glycol, di-propylene glycol, neopentyl glycol, glycerin, and tri-methylene glycol. The polymerization accelerator may be a metallic salt type accelerator including a metal such as cobalt, manganese, calcium, vanadium or iron, and an organic acid such as linolic acid or octylic acid, or may be a tertiary amine type accelerator such as dimethylaniline, any of quaternary ammonium salts, or mecaptan. The vinyl monomer may be selected from styrene, vinyltoluene, chlorostyrene, di-vinyl benzene, methyl methacrylate, methyl acrylate, ethyl acrylate, vinyl acetate, di-allyl phthalate, and acrylonitrile, which are copolymerizable with the unsaturated polyester resin.

The viscosity of the primer having the above components may be adjusted by using an aromatic solvent such as toluene or xylene, an ester solvent such as methyl acetate or ethyl acetate, or a ketonic solvent such as acetone.

What is claimed is:

1. A method of bonding a loudspeaker diaphragm formed of an olefinic resin to another loud speaker component such as a surround, a voice coil bobbin and a dust cap, comprising the steps of:
   applying an adhesion primer comprising an air-curing unsaturated polyester resin to bonding positions on said loudspeaker diaphragm,
   allowing said adhesion primer to cure,
   applying either a rubber or acrylic adhesive to said bonding positions subsequent to curing said adhesive primer,
   superimposing said loudspeaker and said another loudspeaker component so that the respective components are juxtaposed, and
   then joining said loudspeaker and said another loudspeaker component together at said bonding positions.

2. A method as claimed in claim 1, wherein said olefinic resin comprises at least one resin selected from the group consisting of polyethylene resin and polypropylene resin.

3. A method as claimed in claim 2, wherein said air curing unsaturated polyester resin in an unsaturated polyester resin formed by condensation polymerization of a polybasic acid and a polyhydric alcohol and given an air curing property.

4. A method as claimed in claim 3, wherein said polyhydric acid comprises at least one acid selected from the group consisting of fumaric acid, isophthalic acid, succinic acid, adipic acid, maleic anhydride and terephthalic acid.

5. A method as claimed in claim 3, wherein the polyhydric alcohol comprises at least one substance selected from the group consisting of di-ethylene glycol, di-propylene glycol, neopentyl glycol, glycerin, tri-methylene glycol, ethylene glycol and propylene glycol.

6. A method as claimed in claim 3, wherein said air curing unsaturated polyester resin is manufactured by using a polymerization accelerator.

7. A method as claimed in claim 6, wherein said polymerization accelerator includes a metal and an organic acid, said metal comprising at least one substance selected from the group consisting of cobalt, manganese, calcium, vanadium and iron.

8. A method as claimed in claim 7, wherein said organic acid is selected from the group consisting of linolic acid, naphthenic acid and octylic acid.

9. A method as claimed in claim 6, wherein said polymerization accelerator comprises at least one substance selected from the group consisting of a tertiary amine type accelerator, quaternary ammonium and mercaptan.

10. A method as claimed in claim 3, wherein said air curing unsaturated polyester resin is manufactured by adding a vinyl monomer.

11. A method as claimed in claim 10, wherein said vinyl monomer comprises at least one substance selected from the group consisting of styrene, vinyltoluene, chlorostyrene, di-vinyl benzene, methyl methacrylate, methyl acrylate, ethyl acrylate, vinyl acetate, diallyl phthalate, and acrylonitrile.

12. A methyl as claimed in claim 3, wherein at least one substance selected from the group consisting of an aromatic solvent, an ester solvent and a ketonic solvent is added to said adhesion primer to adjust the viscosity thereof.

* * * * *